United States Patent
Flick (10) Patent No.: US 7,344,646 B2
(45) Date of Patent: Mar. 18, 2008

(54) APPARATUS FOR MAGNETIC TREATMENT OF A LIQUID AND ASSOCIATED METHODS

(75) Inventor: Kenneth E. Flick, Douglasville, GA (US)

(73) Assignee: Omega Patents, L.L.C., Douglasville, GA (US)

( * ) Notice: Subject to any disclaimer, the term of this patent is extended or adjusted under 35 U.S.C. 154(b) by 582 days.

(21) Appl. No.: 11/012,361

(22) Filed: Dec. 15, 2004

(65) Prior Publication Data

US 2006/0124526 A1 Jun. 15, 2006

(51) Int. Cl.
*C02F 1/48* (2006.01)
(52) U.S. Cl. ............ 210/695; 99/277.1; 210/222; 215/386; 220/230; 335/303
(58) Field of Classification Search .......... 99/277.1; 210/222, 695; 215/386; 220/230; 335/303
See application file for complete search history.

(56) References Cited

U.S. PATENT DOCUMENTS

| 2,838,179 | A | * | 6/1958 | Thomas | 210/222 |
| 2,957,596 | A | | 10/1960 | Rehborg | |
| 5,354,462 | A | * | 10/1994 | Perritt | 335/303 |
| 5,556,654 | A | | 9/1996 | Fregeau | 426/234 |
| 5,804,068 | A | | 9/1998 | Reed | 210/222 |
| 6,258,020 | B1 | | 7/2001 | Lopez | 600/15 |
| 6,390,319 | B1 | * | 5/2002 | Yu | 220/230 |
| 6,579,222 | B2 | | 6/2003 | Mann | 600/15 |
| 2006/0037902 | A1 | | 2/2006 | Pedersen | 210/222 |

FOREIGN PATENT DOCUMENTS

EP 1029481 8/2000

OTHER PUBLICATIONS

"Wine Cellar Express", by Ale an' Artifacts, Ltd, 1973 . . . 2003, 2 pages, available at www.ebrew.com/miscellaneous_equipment/wine_cellar_express.htm.
"The Perfect Sommelier", WoozyWu dba Wine Lovers Association, 2001-2004, 3 pages, available at www.cellarnot.com.
"The Wine Clip", The Wine Clip, LLC, 1 pg., available at www.thewineclip.com/cgi-bin/category.cgi?category=home undated.

* cited by examiner

*Primary Examiner*—David A Reifsnyder
(74) *Attorney, Agent, or Firm*—Allen, Dyer, Doppelt, Milbrath & Gilchrist, P.A.

(57) ABSTRACT

An apparatus for treating a liquid includes a container containing a liquid, and a magnetic treatment device therefor. The magnetic treatment device may include an elastic band removably fastened around the container and urged thereagainst by elastic deformation of the elastic band, the elastic band being deformable to accommodate containers having different sizes. The magnetic treatment device may also include at least one permanent magnet carried by the elastic band for magnetically treating the liquid in the container. Alternately, the magnetic treatment device may include a band with a joint therein or a drawstring removably fastened around the container.

24 Claims, 8 Drawing Sheets

APPARATUS FOR MAGNETIC TREATMENT OF A LIQUID AND ASSOCIATED METHODS

FIELD OF THE INVENTION

The invention relates to the field of liquid treatment, and, more particularly, to magnetic treatment devices of liquids.

BACKGROUND OF THE INVENTION

It is recognized that the flavor of some beverages may be enhanced by exposure to a magnetic field, which alters the molecular properties. U.S. Pat. No. 6,287,614 to Peiffer, for example, describes reducing the sensory perception of acids and tannins in alcoholic beverages by treating the beverage with a magnetic field. This treatment is asserted to give the alcoholic beverage a more aged flavor. Similarly, European Patent Application No. EP 1,029,481 to Olivieri discloses a series of magnetic bands or flexible panels on an interior portion of a thermally insulated container that, in turn, holds a bottle of liquid.

Accordingly, a number of products have been developed to expose beverages to magnetic fields to enhance flavor. Some of these products also attempt to enhance user convenience when magnetically treating beverages. For example, U.S. Pat. No. 4,872,401 to Lee discloses a container including surrounding sidewalls that have a plurality of magnets mounted on the inner side of the surrounding sidewalls to improve the flavor of fermented substances, such as wine, sauce, and tobacco. Another example is illustrated in U.S. Pat. No. 6,390,319 to Yu which discloses a beverage magnetizing container that exposes a beverage within the container to a magnetic field to promote preservation. The magnetic field is created by permanent magnets in the sidewalls, base, or cap of the container.

Yet another example of a magnetic flavor-enhancing device is a butterfly type clip that clamps around the neck of a wine bottle as is designated The Wine Clip, offered by The Wine Clip LLC of Bethpage, N.Y. Embedded in the rigid body of the clip is a plurality of magnets that are used to magnetically treat the wine in the bottle as the wine is poured, for example.

Other devices magnetically treat beverages during initial processing. For example, U.S. Pat. No. 5,556,654 to Fregeau discloses a flavor treatment assembly into which is piped a liquid for treatment. The liquid passes through the assembly and the treated liquid is then piped into bottles. Similarly, U.S. Pat. No. 6,325,942 to Freije, III discloses a liquid treatment unit that includes a pipe having a plurality of magnets coupled thereto. The magnets treat liquid as it passes through the pipes. U.S. Pat. No. 5,860,353 to Ceccarani discloses an apparatus for accelerating the aging of alcoholic beverages. The apparatus exposes beverages to low-frequency polarized pulsating magnetic fields.

Magnets are also used with liquid containers to control the positioning of the container or a portion of the container. For example, U.S. Pat. No. 2,957,596 to Rehborg discloses a vacuum bottle with a casing having a magnet incorporated into the casing. The magnet is used to secure the vacuum bottle to a metal surface or to secure the cap of the vacuum bottle when it is removed from the vacuum bottle.

Unfortunately, the above devices may not be convenient to use and readily adaptable for different sized containers.

SUMMARY OF THE INVENTION

In view of the foregoing background, it is therefore an object of the invention to provide a magnetic treatment device and associated methods that is convenient to use and readily adaptable for different sized containers.

This and other objects, features, and advantages in accordance with the invention are provided by an apparatus for treating a liquid that includes a container containing a liquid, and a magnetic treatment device therefor. In one class of embodiments, the magnetic treatment device may include an elastic band removably fastened around the container and urged thereagainst by elastic deformation of the elastic band, the elastic band being deformable to accommodate containers having different sizes. The magnetic treatment device may also include at least one permanent magnet carried by the elastic band for magnetically treating the liquid in the container. Accordingly, the magnetic treatment device is capable of securely fitting a wide range of container configurations.

The permanent magnetic may comprise a plurality of permanent magnets arranged in a spaced relation. The container may have an axis and each of the plurality of permanent magnets may comprise an elongate permanent magnet aligned generally parallel to the axis.

The magnetic treatment device may further comprise a respective pocket to receive each permanent magnet and for mounting each permanent magnet to the elastic band. The magnetic treatment device may also comprise a respective hook and loop fastener for removably mounting each permanent magnet to the elastic band.

The elastic band may have a continuous cylindrical shape in some embodiments. In other embodiments the elastic band may have a joint therein permitting adjustment of a size thereof. The magnetic treatment device may further include a hook and loop fastener for closing the joint. The elastic band may comprise a non-magnetic material and the permanent magnet may comprise at least one neodymium magnet.

In another class of embodiments, the magnetic treatment device may include a band, not necessarily elastic, that is removably fastened around the container. The band may have a joint for adjusting the size of the band to accommodate containers having different sizes. The magnetic treatment device may also include at least one permanent magnet carried by the band for magnetically treating the liquid in the container. The magnetic treatment device may further include a hook and loop fastener for closing the joint.

In yet another class of embodiments, the magnetic treatment device may include a drawstring removably fastened around the container and urged thereagainst by drawing tight the drawstring, the drawstring for accommodating containers having different sizes. The magnetic treatment device may also include at least one permanent magnet carried by the drawstring for magnetically treating the liquid in the container.

Each of the permanent magnets may comprise at least one passageway for receiving the drawstring therethrough. The magnetic treatment device may further comprise a respective pair of stops carried by the drawstring for positioning each of the permanent magnets.

A method aspect of the invention is for magnetically treating a liquid within a container. The method may include providing a magnetic treatment device comprising an elastic band for removably fastening around the container, the elastic band being urged against the container by elastic deformation of the elastic band and the elastic band being deformable to accommodate containers having different sizes. The magnetic treatment device may further include at least one permanent magnet carried by the elastic band for magnetically treating the liquid in the container. The method may further include positioning the magnetic treatment device on the container to thereby magnetically treat the liquid.

In an alternate method for magnetically treating a liquid within a container, the method may include providing a magnetic treatment device comprising a band removably fastened around the container and a joint in the band for adjusting the size of the band to accommodate containers having different sizes. The magnetic treatment device may further include at least one permanent magnet carried by the band for magnetically treating the liquid in the container. The method may also include positioning the magnetic treatment device on the container to thereby magnetically treat the liquid.

In yet another alternate method for magnetically treating a liquid within a container, the method may include providing a drawstring for removably fastening around the container and urged thereagainst by drawing tight the drawstring, the drawstring accommodating containers having different sizes. The magnetic treatment device may further comprise at least one permanent magnet carried by the drawstring for magnetically treating the liquid in the container. The method may further include positioning the magnetic treatment device on the container to thereby magnetically treat the liquid.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notation are used to indicate similar elements in alternate embodiments.

Figure 1:
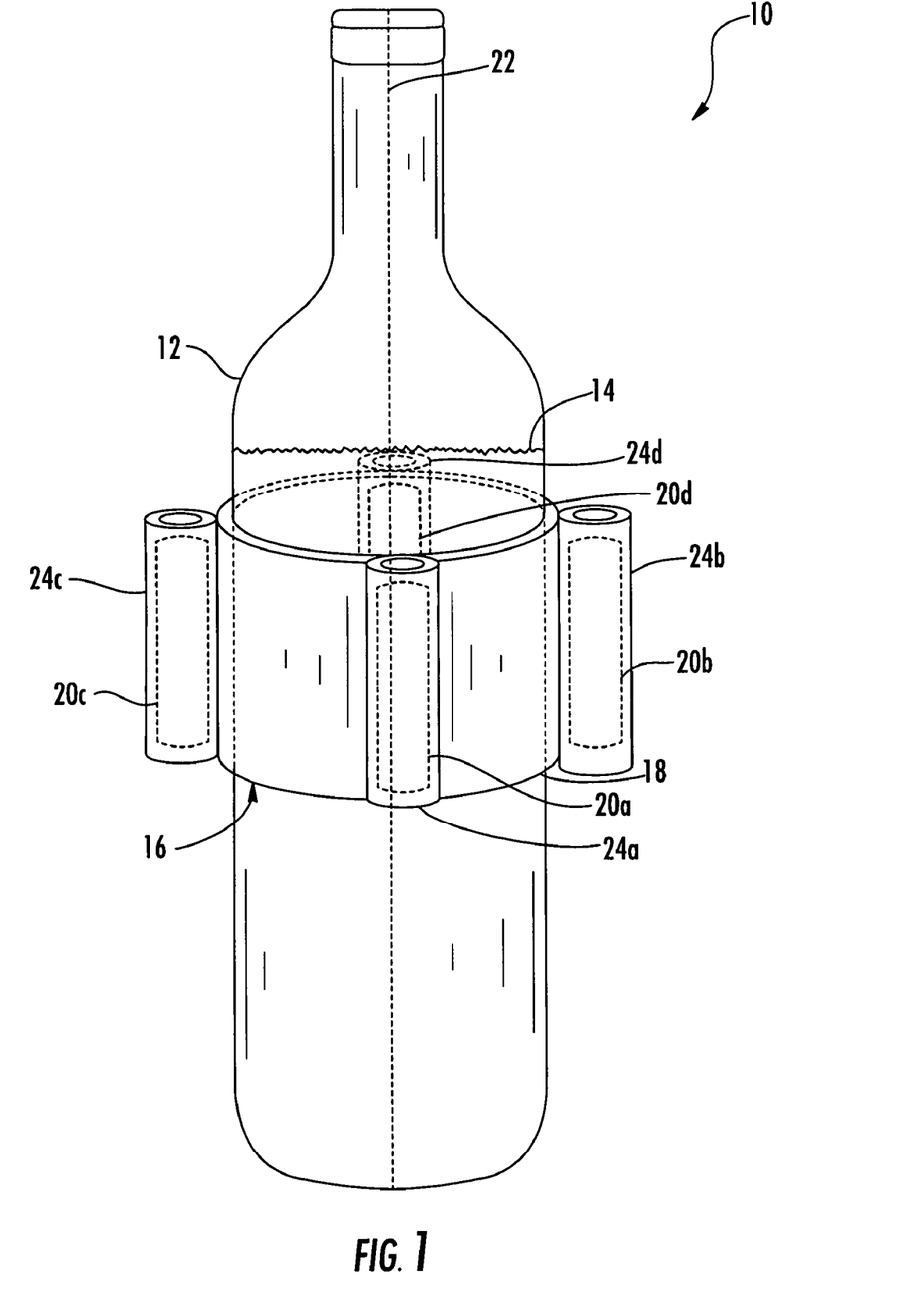
FIG. 1 is a perspective view of a first embodiment of an apparatus for magnetically treating a liquid in accordance with the invention.
Figure 2:
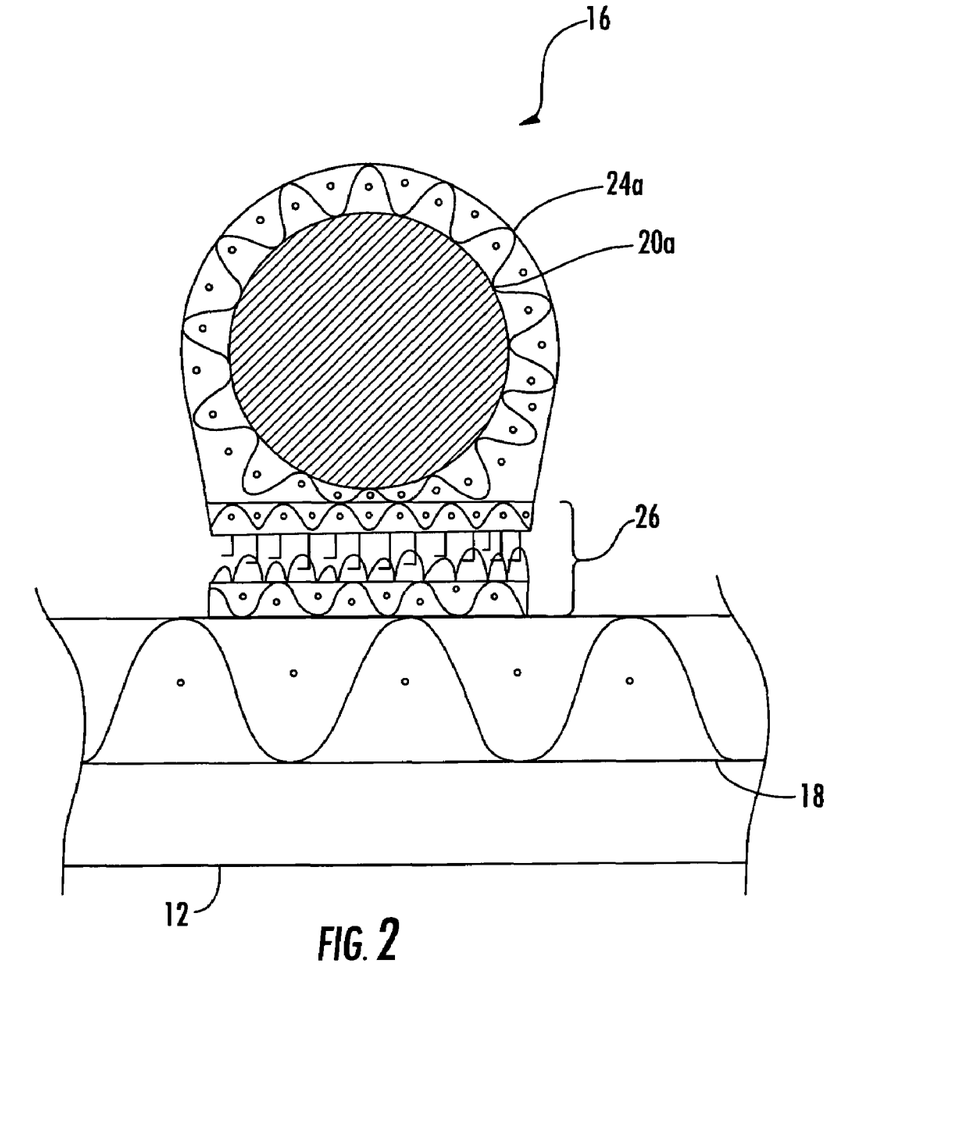
FIG. 2 is a transverse cross-sectional view of a magnet in a pocket connected to the elastic band of the apparatus as shown in FIG. 1.
Figure 3:
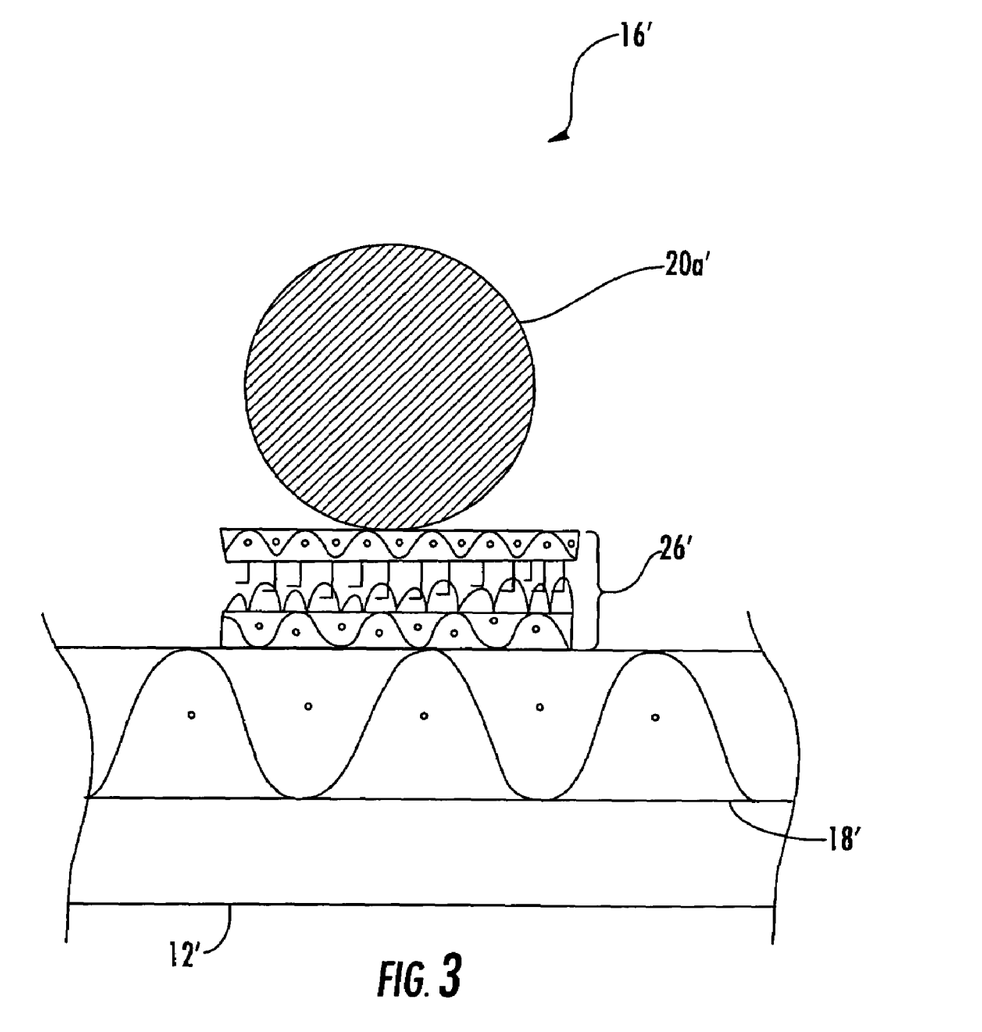
FIG. 3 is a transverse cross-sectional view of a magnet connected to the elastic band of the apparatus shown in FIG. 1.

Referring initially to FIGS. 1-3, an apparatus 10 for magnetically treating a liquid is now described. The apparatus 10 includes a container 12, which contains a liquid 14, and a magnetic treatment device 16. The container 12 can be a wine bottle, soft drink bottle, water bottle, and any number of other containers capable of carrying a liquid. The magnetic treatment device 16 includes an elastic band 18 removably fastened around the container 12 and urged thereagainst by elastic deformation of the elastic band. The elastic band 18 is deformable to accommodate containers having different sizes. The elastic band 18 may comprise at least one of rubber, synthetic rubber, spandex, and other similar materials.

The magnetic treatment device 16 also illustratively includes magnets 20a-20d carried by the elastic band 18 for magnetically treating the liquid 14 in the container 12. The permanent magnets 20a-20d are arranged in a spaced relation about the circumference of the container 12. The container 12 has an axis 22 and each of the plurality of permanent magnets 20a-20d illustratively comprises an elongate permanent magnet aligned generally parallel to the axis. In other embodiments, the permanent magnets may include more than four magnets, or less than four magnets, and may be arranged in different configurations and may have alternate shapes.

The magnetic treatment device 16 further comprises a respective pocket 24a-24d to receive each permanent magnet 20a-20d. The pockets 24a-24d are used for mounting each permanent magnet to the elastic band 18. The pockets 24a-24d may be fabric pockets, for example.

In the illustrated embodiment, the magnetic treatment device 16 comprises a respective hook and loop fastener 26 for removably mounting each pocket 24a-24d carrying a permanent magnet 20a-20d to the elastic band 18 (FIG. 2). In other embodiments, pockets 24a-24d may be fastened to the elastic band 18 using other methods such as snap fasteners, adhesive, sewing, and the like as will be appreciated by those skilled in the art. In another variation, the hook and loop fastener 26' is for removably mounting the permanent magnet 20a' directly to the elastic band 18' (FIG. 3) without a pocket.

Figure 4:
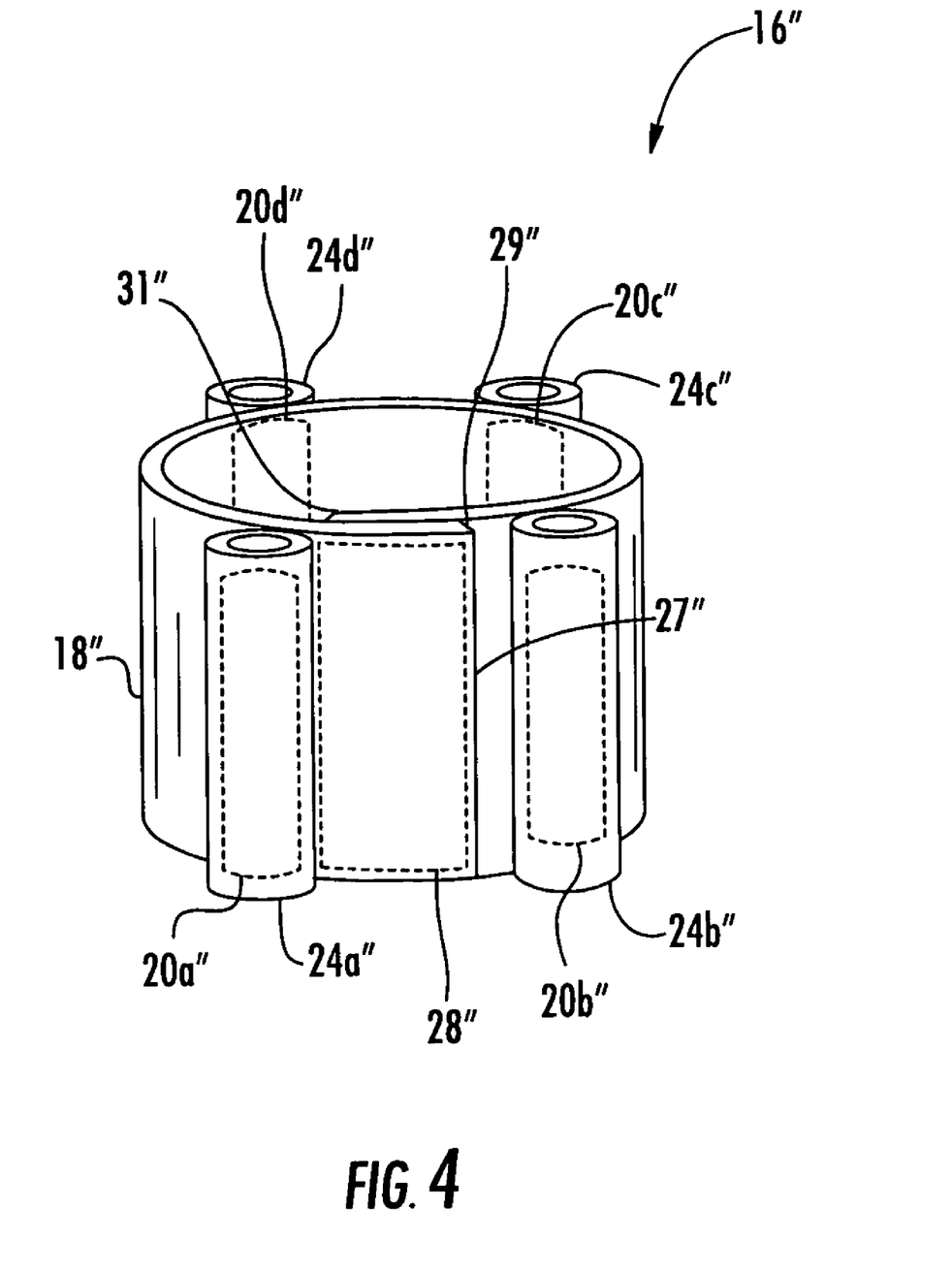
FIG. 4 is a perspective view of a second embodiment of a magnetic treatment device for treating a liquid in accordance with the invention.

In another class of embodiments, shown in FIG. 4, the magnetic treatment device 16" may include a band 18" that can be removably fastened around a container. The band 18" may comprise a substantially inelastic material such as cotton fabric, rayon, and the like. The band 18" has a joint 27" for adjusting the size of the band to accommodate containers having different sizes. The magnetic treatment 16" device illustratively includes a hook and loop fastener 28" for closing the joint 27". The joint 27" is adjusted by overlapping the leading edge 29" over the trailing edge 31" and engaging the hook and loop fastener 28". In other embodiments, the joint 27" may be secured by snap fittings, magnetic clasps, or other fasteners as will be appreciated by those skilled in the art.

The magnetic treatment device 16" also illustratively includes permanent magnets 20a"-20d" carried by the band 18" to be used for magnetically treating a liquid in a container that the magnetic treatment device is fastened to. The permanent magnets 20a"-20d" are secured to band 18" using any of the techniques described above.

Figure 5:
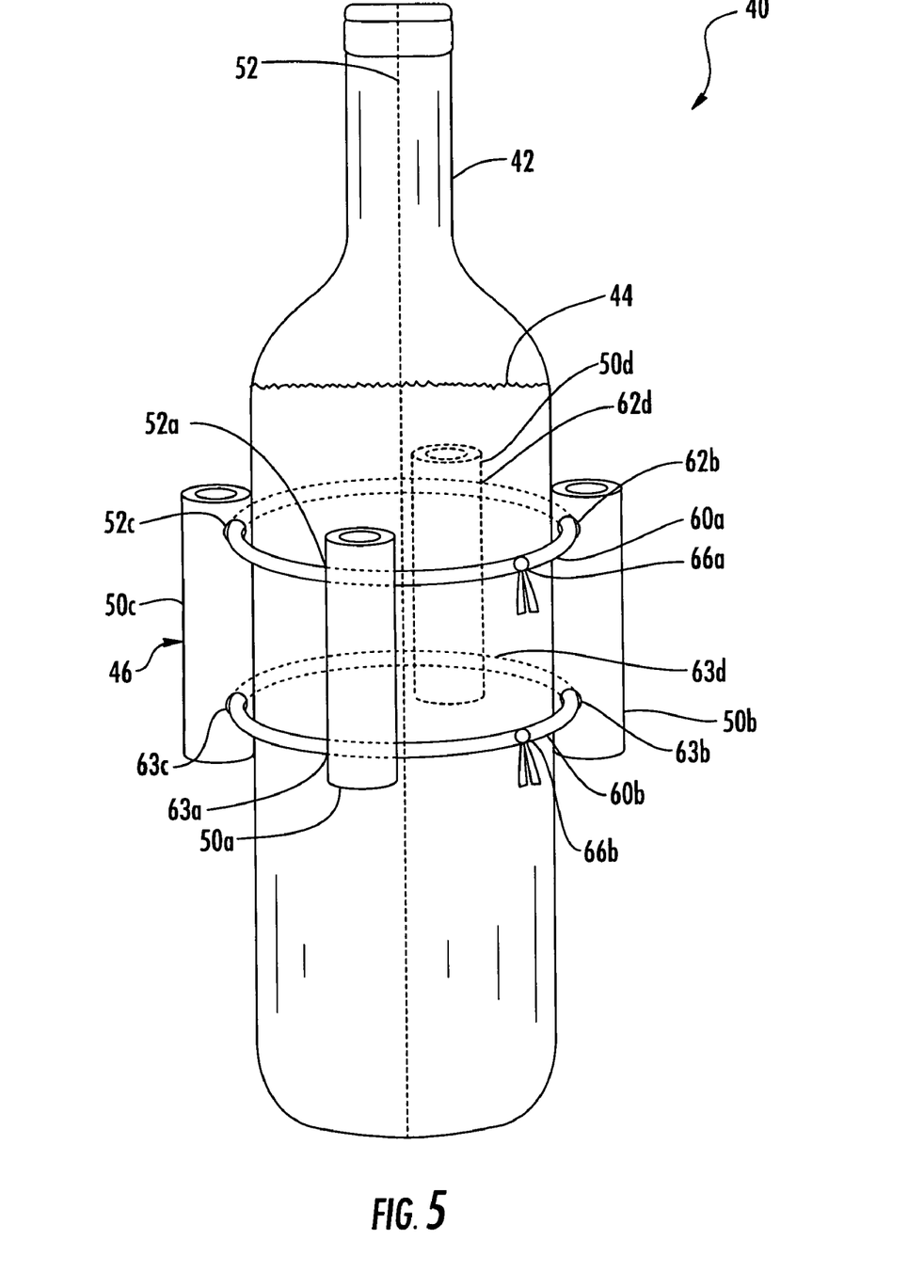
FIG. 5 is a perspective view of a third embodiment of an apparatus for magnetically treating a liquid in accordance with the invention.
Figure 6:
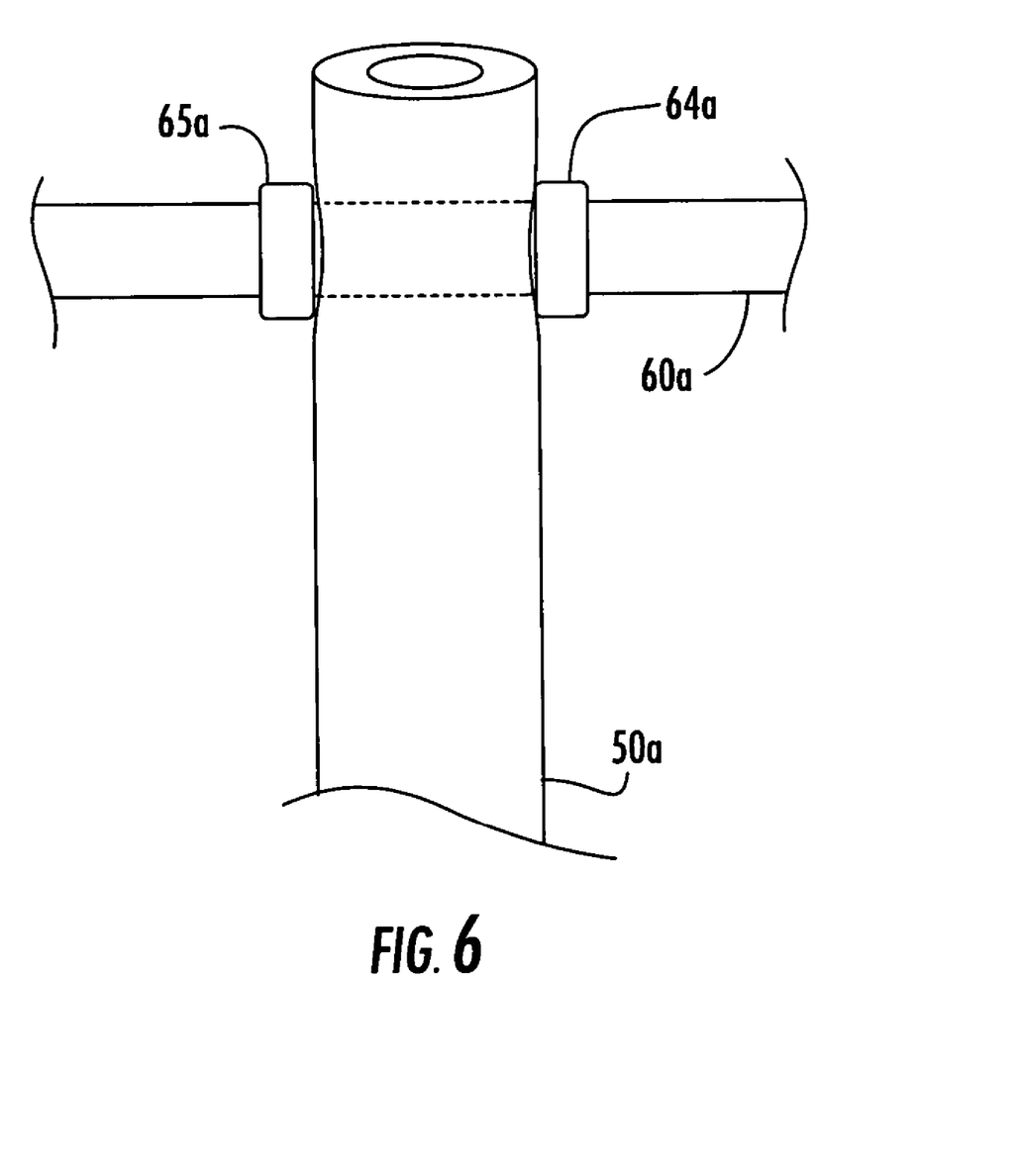
FIG. 6 is an enlarged side elevational view of a portion of the apparatus as shown in FIG. 5.

Turning now additionally to FIGS. 5 and 6, yet another class of embodiments of the apparatus 40 for treating a liquid is shown. The magnetic treatment device 46 illustratively includes the drawstrings 60a, 60b removably fastened around the container 42 and urged thereagainst by drawing tight the drawstring. In other words, the drawstring is for accommodating containers having different sizes. The drawstrings 60a, 60b can be drawn tight by adjusting the drawstring fasteners 66a, 66b. In other embodiments, the magnetic treatment device 46 may have only one drawstring, while in others, there may be more than two drawstrings.

The magnetic treatment device 46 also illustratively includes permanent magnet 50a-50d carried by the drawstrings 60a, 60b. The permanent magnets 50a-50d are illustratively arranged in a spaced relation, for example. The container 42 has an axis 52 and each of the plurality of permanent magnets 50a-50d comprises an elongate permanent magnet aligned generally parallel to the axis. In other embodiments, the permanent magnets may include more than four magnets, or less than four magnets, and may be arranged in different configurations and have alternate shapes.

The permanent magnets 50a-50d each comprises passageways 62a-62d and 63a-63d for receiving the respective drawstring 60a, 60b therethrough. In other embodiments, there may be only one passageway per permanent magnet or there may be more than two passageways per permanent magnet as will be appreciated by those skilled in the art.

The magnetic treatment device 46 further comprises a respective pair of stops 64a and 65a, for example, carried by the drawstring 60a for positioning the permanent magnet 50a (FIG. 6). The stops 64a and 65a can be fasteners, knots, and other types of stops as will be appreciated by those skilled in the art.

Figure 7:
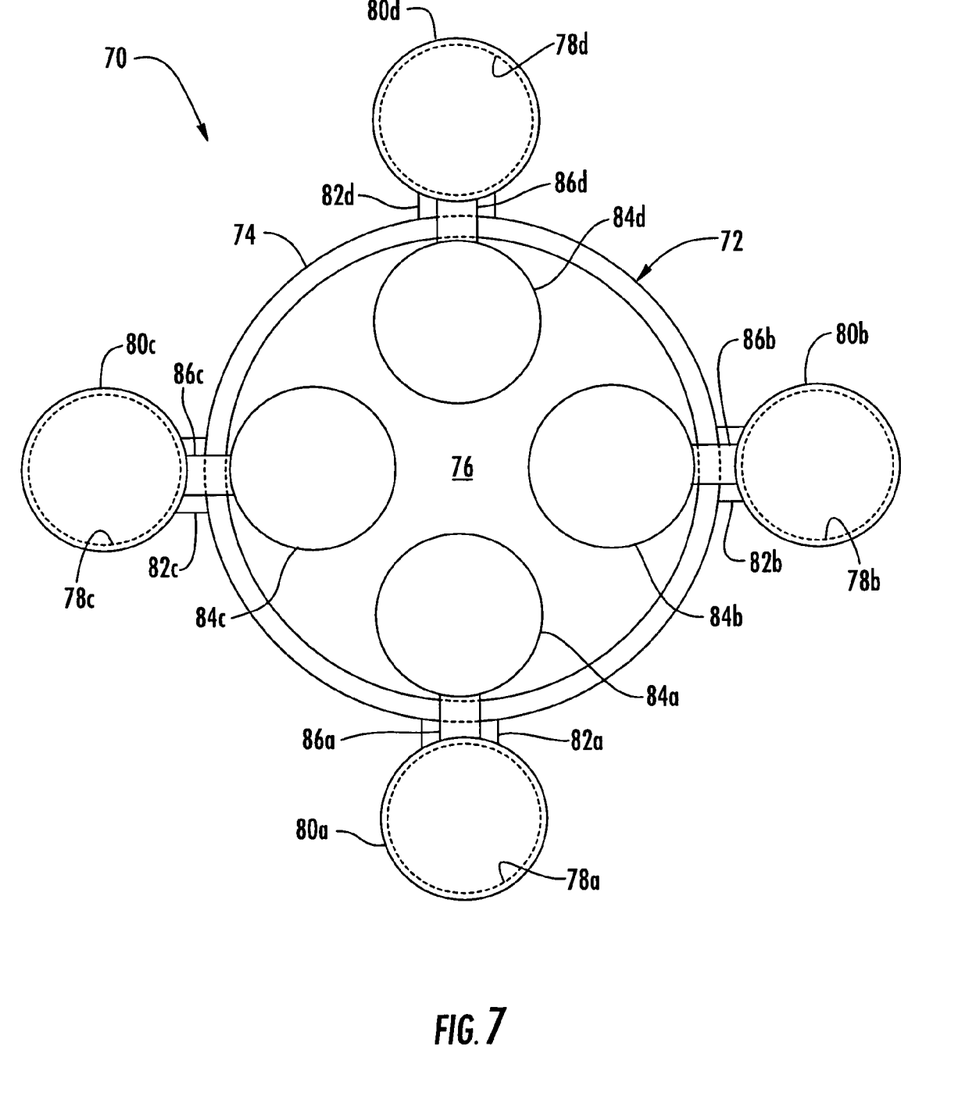
FIG. 7 is a top plan view of a variation of the first embodiment of the magnetic treatment device as shown in FIG. 1.

Referring now to FIG. 7, another embodiment of an apparatus 70 for treating a liquid is shown. The magnetic treatment device 72 illustratively includes an elastic band 74 that can be removably fastened around a container positioned in its central opening 76. The elastic band 74 may be rubber, for example, to conform to a container on which it is placed.

The magnetic treatment device 72 also illustratively includes permanent magnets 78a-78d carried by respective pockets 80a-80d. In the illustrated embodiment, the pockets 80a-80d are sized during manufacture to later receive the permanent magnets 78a-78d. The pockets 80a-80d are illustratively four in number and arranged in a spaced relation. In other embodiments, the pockets 80a-80d, and the permanent magnets 78a-78d, may be more than four or less than four. In addition, the pockets 80a-80d and the permanent magnets 78a-78d may be arranged in different configurations and have alternate shapes.

The pockets 80a-80d are connected to the elastic band 74 via respective connection pads 82a-82d. The connection pads 82a-82d also serve as padding to help reduce the impact of the respective permanent magnets 78a-78d on a container when the magnetic treatment device 72 is fitted onto the container. The pockets 80a-80d also include respective closure caps 84a-84d, which are illustratively shown in their open positions in FIG. 7. The closure caps 84a-84d are connected to their respective pockets 80a-80d by their respective tethers 86a-86d. The closure caps 84a-84d can be closed onto each respective pocket 80a-80d and held in place by a friction fit, clasp, or other fastening technique as will be appreciated by those skilled in the art.

The elastic band 74, pockets 80a-80d, connection pads 82a-82d, closure caps 84a-84d, and tethers 86a-86d may comprise the same material and may be integrally molded. In other embodiments, the elastic band 74, pockets 80a-80d, connection pads 82a-82d, closure caps 84a-84d, and tethers 86a-86d may comprise different materials and/or may be connected together using bonding, stitching, and other techniques as will be appreciated by those skilled in the art.

Figure 8:
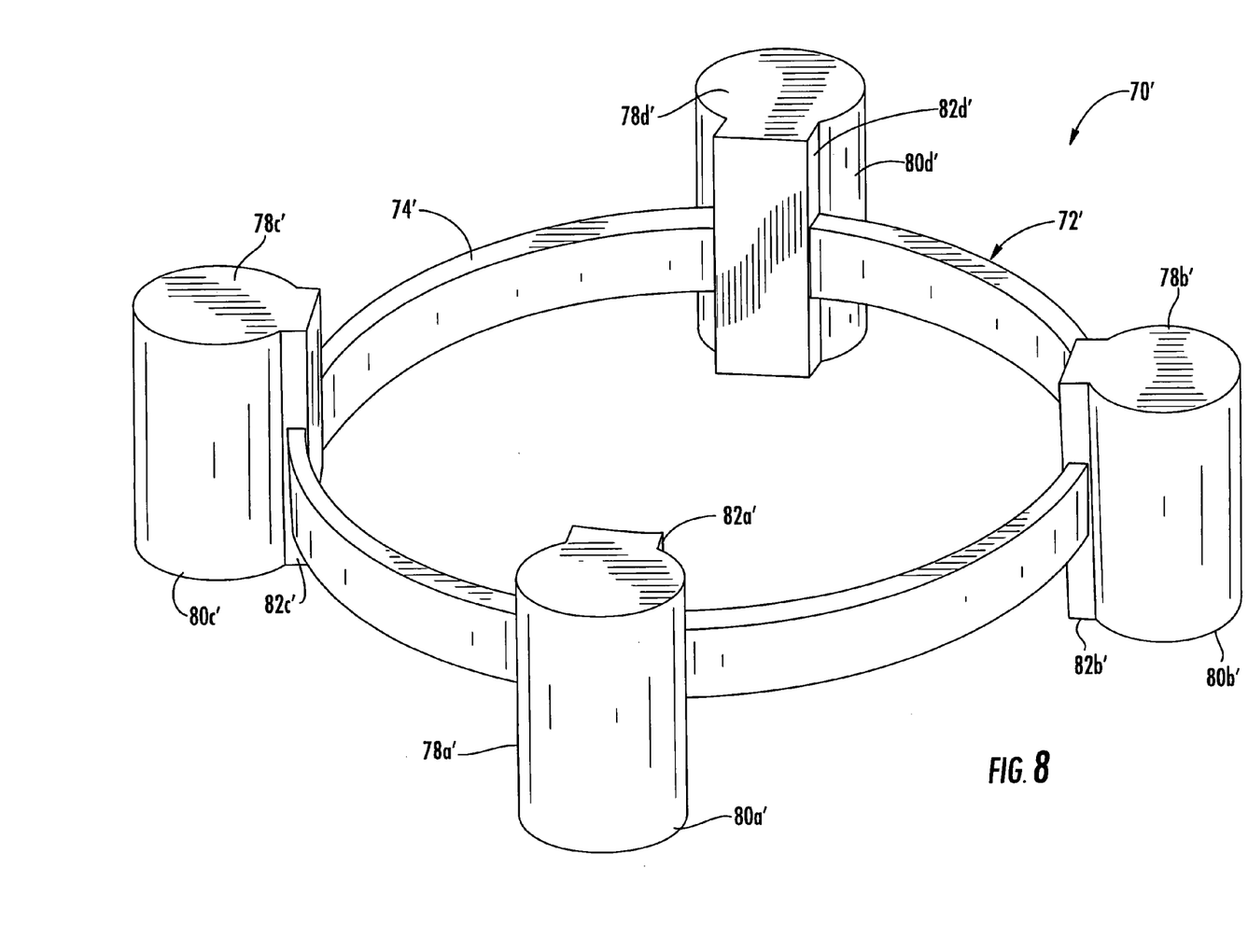
FIG. 8 is a perspective view of another variation of the first embodiment of the first embodiment of the magnetic treatment device as shown in FIG. 1.

In another variation, the elastic band 74', pockets 80a'-80d', and connection pads 82a'-82d' comprise the same material and are integrally molded as is shown in FIG. 8. The pockets 80a'-80d' are molded around the permanent magnets 78a'-78d' to encapsulate the permanent magnets during the manufacturing process. Accordingly, there are no removable closure caps or associated tethers.

A method aspect of the invention is for magnetically treating a liquid within a container. The method may include providing a magnetic treatment device comprising an elastic band for removably fastening around the container, the elastic band being urged against the container by elastic deformation of the elastic band and the elastic band being deformable to accommodate containers having different sizes. The magnetic treatment device may further include at least one permanent magnet carried by the elastic band for magnetically treating the liquid in the container. The method may further include positioning the magnetic treatment device on the container to thereby magnetically treat the liquid.

In an alternate method for magnetically treating a liquid within a container, the method may include providing a magnetic treatment device comprising a band removably fastened around the container and a joint in the band for adjusting a size of the band to accommodate containers having different sizes. The magnetic treatment device may further include at least one permanent magnet carried by the band for magnetically treating the liquid in the container. The method may further include positioning the magnetic treatment device on the container to thereby magnetically treat the liquid.

In yet another alternate method for magnetically treating a liquid within a container, the method may include providing a drawstring for removably fastening around the container and urged thereagainst by drawing tight the drawstring, the drawstring accommodating containers having different sizes. The magnetic treatment device may further comprise at least one permanent magnet carried by the drawstring for magnetically treating the liquid in the container. The method may further include positioning the magnetic treatment device on the container to thereby magnetically treat the liquid.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that other modifications and embodiments are intended to be included within the scope of the appended claims.

That which is claimed is:

1. An apparatus for treating a liquid comprising:
 a container containing a liquid, and a magnetic treatment device therefor;
 said magnetic treatment device comprising
  an elastic band removably fastened around said container and having an interior surface and an exterior surface opposite the interior surface, the interior surface being urged against said container by elastic deformation of said elastic band, said elastic band being deformable to accommodate containers having different sizes, and at least one permanent magnet carried by the exterior surface of said elastic band for magnetically treating the liquid in said container.

2. An apparatus according to claim 1 wherein said at least one permanent magnetic comprises a plurality of permanent magnets arranged in spaced relation.

3. An apparatus according to claim 2 wherein said container has an axis; and wherein each of said plurality of permanent magnets comprises an elongate permanent magnet aligned generally parallel to the axis.

4. An apparatus according to claim 2 wherein said magnetic treatment device further comprises a respective pocket receiving each permanent magnet and mounting each to said elastic band.

5. An apparatus according to claim 2 wherein said magnetic treatment device further comprises a respective hook and loop fastener for removably mounting each permanent magnet to said elastic band.

6. An apparatus according to claim 1 wherein said elastic band has a cylindrical shape with a joint therein permitting adjustment of a size thereof.

7. An apparatus according to claim 6 wherein said magnetic treatment device further comprises a hook and loop fastener for closing the joint.

8. An apparatus for treating a liquid comprising:
a container having an axis and containing a liquid, and a magnetic treatment device therefor;
said magnetic treatment device comprising
a band removably fastened around said container and having an interior surface and an exterior surface opposite the interior surface, the interior surface being urged against said container,
a joint in said band for adjusting a size of said band to accommodate containers having different sizes, and
at least one elongate permanent magnet carried by the exterior surface of said band and being aligned generally parallel to the axis of said container for magnetically treating the liquid therein.

9. An apparatus according to claim 8 wherein said magnetic treatment device further comprises a hook and loop fastener for closing the joint.

10. An apparatus according to claim 8 wherein said at least one permanent magnetic comprises a plurality of permanent magnets arranged in spaced relation.

11. An apparatus according to claim 10 wherein said magnetic treatment device further comprises a respective pocket receiving each permanent magnet and mounting each to said band.

12. An apparatus according to claim 10 wherein said magnetic treatment device further comprises a respective hook and loop fastener for removably mounting each permanent magnet to said band.

13. An apparatus for treating a liquid comprising:
a container containing a liquid, and a magnetic treatment device therefor;
said magnetic treatment device comprising
at least one drawstring removably fastened around said container and having an interior surface and an exterior surface opposite the interior surface, the interior surface being urged against said container by drawing tight said at least one draw string, said at least one drawstring accommodating containers having different sizes, and
at least one permanent magnet carried by the exterior surface of said at least one drawstring for magnetically treating the liquid in said container.

14. An apparatus according to claim 13 wherein said at least one permanent magnetic comprises a plurality of permanent magnets arranged in spaced relation.

15. An apparatus according to claim 14 wherein said container has an axis; and wherein each of said plurality of permanent magnets comprises an elongate permanent magnet aligned generally parallel to the axis.

16. An apparatus according to claim 15 wherein each of said permanent magnets comprises at least one passageway receiving said at least one drawstring therethrough.

17. An apparatus according to claim 16 wherein said magnetic treatment device further comprises a respective pair of stops carried by said at least one drawstring for positioning each of said permanent magnets.

18. A method for magnetically treating a liquid within a container, the method comprising:
providing a magnetic treatment device comprising
an elastic band for removably fastening around the container, the elastic band having an interior surface and an exterior surface opposite the interior surface, the interior surface being urged against the container by elastic deformation of the elastic band and the elastic band being deformable to accommodate containers having different sizes, and
at least one permanent magnet carried by the exterior surface of the elastic band for magnetically treating the liquid in the container; and
positioning the magnetic treatment device on the container to thereby magnetically treat the liquid.

19. The method according to claim 18 wherein the at least one permanent magnetic comprises a plurality of permanent magnets arranged in spaced relation.

20. The method according to claim 19 wherein the container has an axis and each of the plurality of permanent magnets comprises an elongate permanent magnet; and the method further comprising aligning each of the elongated permanent magnets generally parallel to the axis.

21. The method according to claim 19 wherein the magnetic treatment device further comprises a respective pocket receiving each permanent magnet; and the method further comprising mounting each permanent magnet to the elastic band using the respective pocket.

22. The method according to claim 21 wherein the magnetic treatment device further comprises a respective hook and loop fastener for each permanent magnet; and the method further comprising removably mounting each permanent magnet to the elastic band with the respective hook and loop fastener.

23. The method according to claim 18 wherein the elastic band has a cylindrical shape with a joint therein; and the method further comprising adjusting a size of the elastic band by adjusting the joint.

24. The method according to claim 23 wherein the magnetic treatment device further comprises a hook and loop fastener for closing the joint.

* * * * *

UNITED STATES PATENT AND TRADEMARK OFFICE
CERTIFICATE OF CORRECTION

PATENT NO. : 7,344,646 B2  Page 1 of 1
APPLICATION NO. : 11/012361
DATED : March 18, 2008
INVENTOR(S) : Kenneth E. Flick It is certified that error appears in the above-identified patent and that said Letters Patent is hereby corrected as shown below:

Column 2, Line 21    Delete: "magnetic"
                     Insert: --magnet--

Column 3, Line 54    Delete: "of the first embodiment"

Column 7, Line 5     Delete: "magnetic"
                     Insert: --magnet--

Column 8, Line 5     Delete: "magnetic"
                     Insert: --magnet--

Column 8, Line 36    Delete: "magnetic"
                     Insert: --magnet--

Signed and Sealed this

Thirtieth Day of September, 2008

JON W. DUDAS
*Director of the United States Patent and Trademark Office*